Sept. 29, 1970 P. DEY 3,531,578
STRUCTURES FOR SUPPORTING OVERHEAD ELECTRIC POWER LINES
Filed Dec. 13, 1968 2 Sheets-Sheet 1

Inventor
PHANIBHUSAN DEY
By
Webb, Burden, Robinson & Webb
Attorneys

United States Patent Office 3,531,578
Patented Sept. 29, 1970

3,531,578
STRUCTURES FOR SUPPORTING OVERHEAD ELECTRIC POWER LINES
Phanibhusan Dey, New Barnet, England, assignor to British Insulated Callender's Cables Limited, London, England
Filed Dec. 13, 1968, Ser. No. 783,621
Claims priority, application Great Britain, Dec. 22, 1967, 58,346/67
Int. Cl. H02g 7/20; E04h 12/24
U.S. Cl. 174—43                                13 Claims

ABSTRACT OF THE DISCLOSURE

A cross-arm for carrying conductors of an overhead electric power line and a power line including supporting structures having the cross-arm. The cross-arm is divided into three separable parts: two end parts and an intermediate part which has greater rigidity than the end parts. The end parts are made substantially of insulating material and the intermediate part substantially of metal. The length of the intermediate part is at least one-fifth of the total length of the cross-arm.

---

Figure 1:
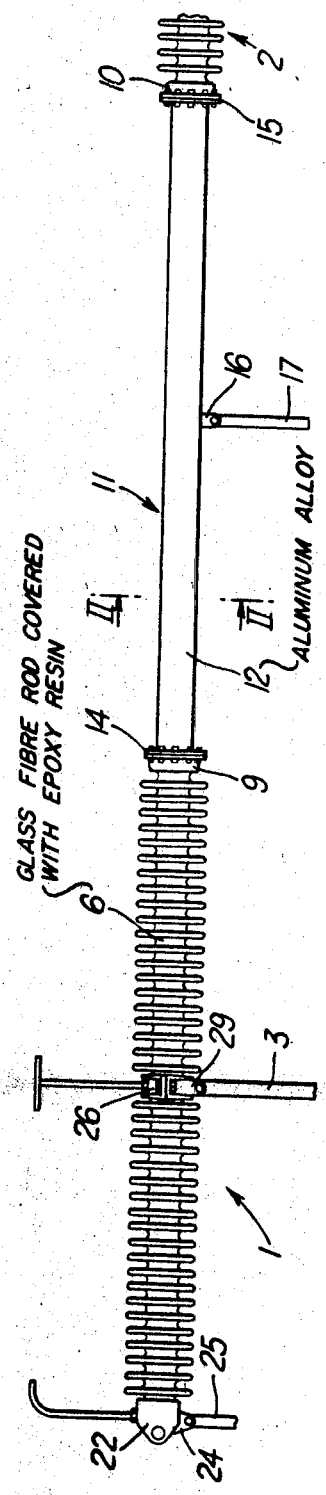

This invention relates to supporting structures for overhead electric power lines and to cross-arms for use in such structures. The cross-arms are of the kind adapted to support three horizontally spaced conductors, or groups of conductors, when mounted substantially horizontally on two supports to each of which the cross-arm is attached between one of the outermost conductors, or groups of conductors, and the middle conductor, or group of conductors. The supports may for example be at the upper ends of the poles of an H-pole structure or may be incorporated in a lattice tower specifically designed for supporting such cross-arms. For convenience the term "conductor" will hereinafter be used to include groups of "bundles" or conductors cross-connected to function as a single conductor.

More particularly the invention relates to cross-arms of this kind which provide the whole of or a substantial proportion of the necessary insulation resistance and tracking resistance between the conductors of the overhead line and/or between such conductors and the supports for the cross-arms.

The cross-arm in accordance with the invention is divided transversely into three separable main parts; two end parts made substantially wholly of insulating material, each adapted to support at one end one of the outermost conductors and to be supported at an intermediate point along its length by one of the supports for the cross-arm; and an intermediate part made substantially wholly of metal rigidly attached at its ends to the end parts and adapted to supoprt the middle conductor of the line. The intermediate part is of a cross-section such that it has a greater rigidity than the end parts and its length is at least one fifth the length of the cross-arm.

The end parts will normally be substantially the same length but in supporting structures at angles in the route of overhead electric power lines using suspension insulators, it may be found preferable to make one end part longer than the other. The length of the intermediate part will normally be of the same order as that of the end parts and when the end parts are equal in length the intermediate part is preferably of substantially the same length as the end parts.

The intermediate part preferably comprises a metal tube and may, for example, be a tube of an aluminium alloy. The metal tube may be provided with a protective and/or insulating covering and may be filled with a material that inhibits the entry of moisture, for example a cellular plastics material.

The end parts preferably each comprise, as a main structural part, an elongated member made substantially wholly from resin bonded fibres of high tensile strength, for instance a solid or hollow rod of resin bonded glass fibre, and protected over at least a part of its length by one or more elongated rigid sleeves of insulating material, for instance of a cast resin, which may or may not be formed with circumferential ribs to increase the surface leakage path along the end part.

Figure 2:
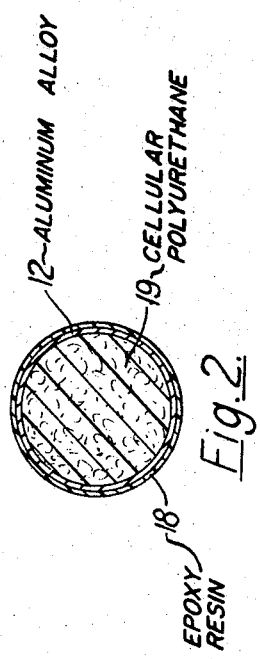
Figure 3:
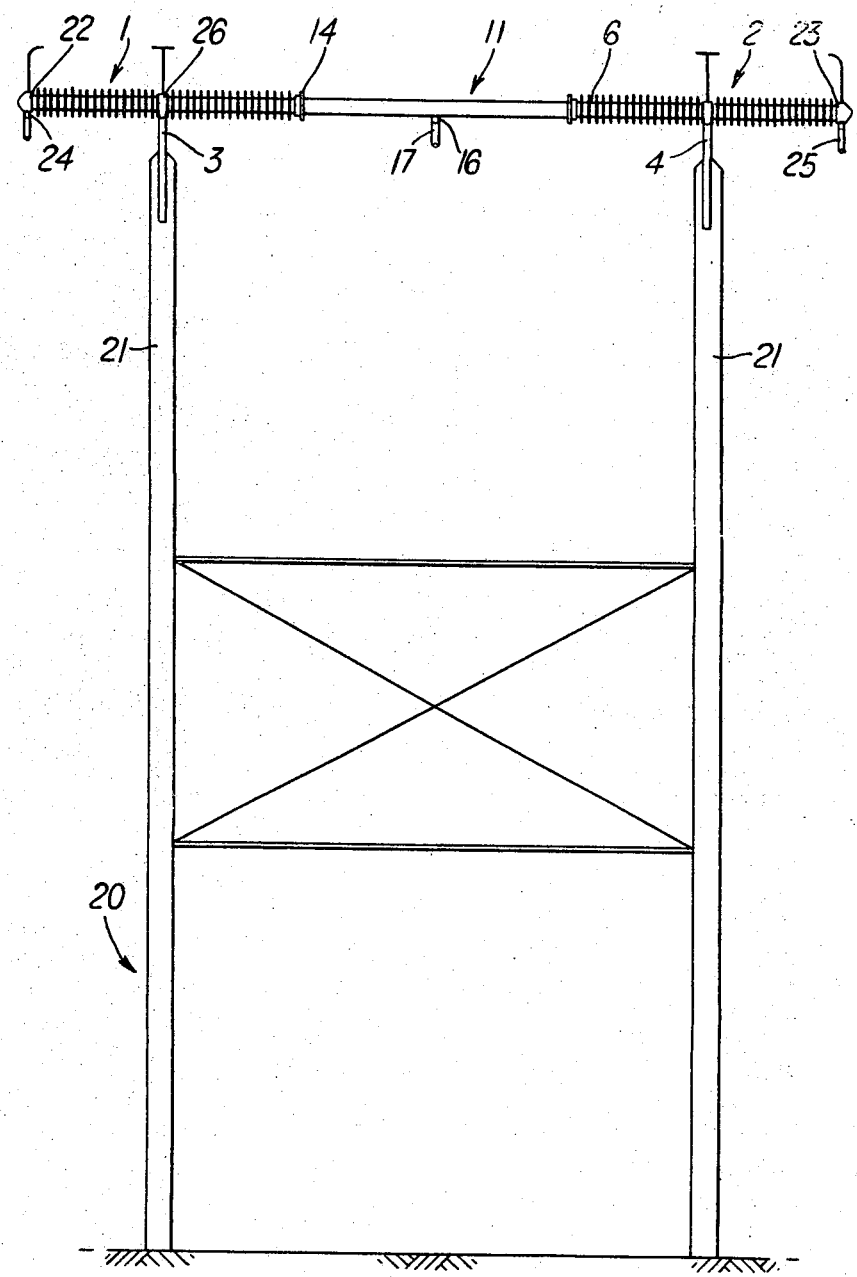

The invention will be further illustrated by a description with reference to the accompanying drawings of an example of a 132 kv. cross-arm for a three phase overhead transmission line. In the drawings:

FIG. 1 is a fragmental elevation of the cross-arm,
FIG. 2 is a section of the intermediate part of the cross-arm taken on the line II—II in FIG. 1, and
FIG. 3 is a diagrammatic elevation of an H-shaped structure incorporating the cross-arm shown in FIG. 1.

Referring to the drawings, the cross-arm is designed for mounting horizontally on an H-shaped structure, usually referred to as an H pole, and comprises two identical end parts 1 and 2, each made substantially wholly of insulating material and of length 8 feet (2.44 m.), and an intermediate metal part 11 of the same length. The end parts 1 and 2 are each supported by a vertical bracket 3 and 4 attached to the top end of one of the poles 21 of the H structure 20 (FIG. 3). Each of the end parts 1 and 2 comprises, as its main structural element, a resin bonded glass fibre rod of rectangular cross-section and an open-ended ribbed sleeve 6 of cycloaliphatic epoxy resin containing powdered or inert fillers.

The intermediate metal part 11 comprises an aluminum alloy tube 12 of length 8 feet (2.44 m.), outside diameter 5 inches (12.7 cm.) and wall thickness 0.125 inch (3.2 mm.), provided with end flanges 14 and 15. A lug 16 is welded to the middle point of the tube 12 and carries a strap 17 supporting a conductor clamp for the middle conductor of the three phase line.

As will be seen on referring to FIG. 2, the metal tube 12 may be provided with a protective and insulating covering 18 of cyclo-aliphatic epoxy resin compound and may be filled with cellular polyurethane 19 to inhibit the entry of moisture.

To facilitate attachment to the top end of one of the poles 21, each end part 1 and 2 has mid-way between its ends a two-part metal clamp 26 consisting of upper and lower clamping jaws lined with butyl rubber to distribute the mechanical load over the engaged surface of the sleeve 6. The lower jaw is formed with a lug 29 for attachment to one of the brackets 3 and 4.

Secured to the inner end of each end part 1 and 2 are fittings 9 and 10 by which the two end parts are connected to the end flanges 14 and 15 of the intermediate part 11. Each fitting 9 and 10 is in the form of a metal cap which fits over and is anchored to the end of the resin bonded glasse fibre rod with a small clearance and overlaps the end of the sleeve 6. The caps are then each sealed to the sleeve 6 with which it is associated by a sealing ring of elastomeric material which enters endless grooves in overlapping inner and outer peripheral surfaces of the sleeve and cap and is bonded to the side walls of each groove.

End fittings 22 and 23 secured to the outer ends of the end parts 1 and 2 are similar in construction to the fittings 9 and 10 and each has a lug 24 which carries a strap 25 supporting a conductor clamp for an outer conductor of the three phase line.

The end parts 1 and 2 of the cross-arm are preferably made by the method described and claimed in the Complete Specification of British Pat. No. 1,126,411.

The present invention is applicable both to supporting structures in which the conductors are carried on brackets directly mounted on the cross-arms and to structures in which the conductors are suspended from the cross-arms by short insulator strings, that is to say strings shorter than used with metal cross-arms.

By using an intermediate part of greater rigidity, in accordance with the invention, the sag at the ends of the cross-arms is reduced and a greater spacing between the conductors can be obtained without increasing the maximum length of the insulating parts necessary to obtain the required insulating and anti-tracking properties.

What I claim as my invention is:

1. A cross-arm adapted to support three horizontally spaced conductors of an overhead electric power line and to be mounted substantially horizontally on two supports, which cross-arm is divided transversely into three separable main parts comprising:
   (a) two end parts made substantially wholly of insulating material, each having at one end means for supporting one of the outermost conductors and having at an intermediate point along its length means for attaching said end part to one of the supports for the cross-arm, and
   (b) an intermediate part made substantially wholly of metal rigidly attached at its ends to the end parts and having means for supporting the middle conductor of the line, the intermediate part being of a cross-section such that it has a greater rigidity than the end parts and having a length that is at least one fifth the length of the cross-arm.

2. A cross-arm as claimed in claim 1, wherein the intermediate part comprises a metal tube.

3. A cross-arm as claimed in claim 2, wherein the metal tube is provided with a protective and insulating covering.

4. A cross-arm as claimed in claim 2, wherein the metal tube is filled with a material that inhibits the entry of moisture.

5. A cross-arm as claimed in claim 4, wherein the moisture-inhibiting filling material is a cellular plastics material.

6. A cross-arm as claimed in claim 2, wherein the intermediate part is a tube of aluminium alloy.

7. A cross-arm as claimed in claim 1, wherein the end parts each comprise, as a main structural part, an elongated member made substantially wholly from resin bonded fibres of high tensile strength and protected over at least a part of its length by at least one elongated rigid sleeve of insulating material.

8. A cross-arm as claimed in claim 7, wherein the elongated member of each end part comprises a rod of resin bonded glass fibre.

9. A cross-arm as claimed in claim 7, wherein the sleeve of each end part is formed from a cast resin.

10. A cross-arm as claimed in claim 7, wherein the sleeve of each end part is formed with circumferential ribs to increase the surface leakage path along the end part.

11. A cross-arm as claimed in claim 1, wherein the end parts of the cross-arm are of substantially the same length.

12. A cross-arm as claimed in claim 11, wherein the intermediate part is of substantially the same length as each of the end parts.

13. An overhead electric power line comprising three horizontally spaced conductors supported by a plurality of supporting structures at intervals along the length of the line, at least one of the supporting structures comprising two supports on which is mounted substantially horizontally a cross-arm divided transversely into three main parts comprising:
   (a) two end parts made substantially wholly of insulating material, each of which supports at one end one of the outermost conductors and is itself supported at an intermediate point along its length by one of the two supports, and
   (b) an intermediate part made substantially wholly of metal rigidly attached to the end parts and supporting the middle conductor of the line, the intermediate part being of a cross-section such that it has a greater rigidity than the end parts and having a length that is at least one fifth the length of the cross-arm.

References Cited

UNITED STATES PATENTS

| | | | |
|---|---|---|---|
| 2,437,375 | 3/1948 | Buxton | 174—45 |
| 2,870,793 | 1/1959 | Bailey. | |
| 3,342,925 | 9/1967 | Lewis et al. | 174—45 |

FOREIGN PATENTS

| | | |
|---|---|---|
| 1,403,423 | 5/1965 | France. |
| 745,317 | 2/1956 | Great Britain. |
| 919,534 | 2/1963 | Great Britain. |

LARAMIE E. ASKIN, Primary Examiner

U.S. Cl. X.R.

52—697; 174—45